(12) United States Patent
Cheikh

(10) Patent No.: US 9,847,815 B2
(45) Date of Patent: Dec. 19, 2017

(54) DEVICE FOR COMMUNICATION BY MAGNETIC COUPLING

(71) Applicants: CONTINENTAL AUTOMOTIVE FRANCE, Toulouse (FR); CONTINENTAL AUTOMOTIVE GMBH, Hannover (FR)

(72) Inventor: Mohamed Cheikh, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/329,739

(22) PCT Filed: Jul. 23, 2015

(86) PCT No.: PCT/EP2015/001515
§ 371 (c)(1),
(2) Date: Jan. 27, 2017

(87) PCT Pub. No.: WO2016/015847
PCT Pub. Date: Feb. 4, 2016

(65) Prior Publication Data
US 2017/0214435 A1    Jul. 27, 2017

(30) Foreign Application Priority Data
Jul. 31, 2014   (FR) ..................... 14 57409

(51) Int. Cl.
H04B 5/00    (2006.01)
H01F 17/02    (2006.01)
H01F 17/04    (2006.01)

(52) U.S. Cl.
CPC .......... *H04B 5/0081* (2013.01); *H01F 17/02* (2013.01); *H01F 17/04* (2013.01); *H04B 5/0087* (2013.01)

(58) Field of Classification Search
CPC ..... H04B 5/0081; H04B 5/0087; H01F 17/02; H01F 17/04
USPC ....................................... 455/26.1
See application file for complete search history.

(56) References Cited

U.S. PATENT DOCUMENTS

| | | | | |
|---|---|---|---|---|
| 6,333,841 B1 * | 12/2001 | Sasaki | ............... | B82Y 10/00 360/123.49 |
| 6,541,065 B1 * | 4/2003 | Sasaki | ............... | G11B 5/3163 427/130 |
| 7,283,642 B2 * | 10/2007 | Milot | ............... | H04R 9/025 381/400 |
| 8,792,823 B2 * | 7/2014 | Liu | ............... | H04L 45/50 370/388 |
| 9,697,938 B2 * | 7/2017 | Yan | ............... | H01F 5/003 |

(Continued)

OTHER PUBLICATIONS

International Search Report, dated Sep. 14, 2015, from corresponding PCT application.

*Primary Examiner* — Hai V Nguyen
(74) *Attorney, Agent, or Firm* — Young & Thompson

(57) ABSTRACT

Disclosed is a communication device using magnetic coupling including a communication module linked to a first planar coil (100). The first coil (100) is designed to form a magnetic field in which the field lines are orthogonal to the plane of the first coil (100) in a first zone (10) of the plane. The device includes a unit for orienting the magnetic field such that the field lines are not orthogonal to the plane of the first coil (100) in a second zone (20) of the plane.

20 Claims, 2 Drawing Sheets

(56) References Cited

U.S. PATENT DOCUMENTS

Figure 3:
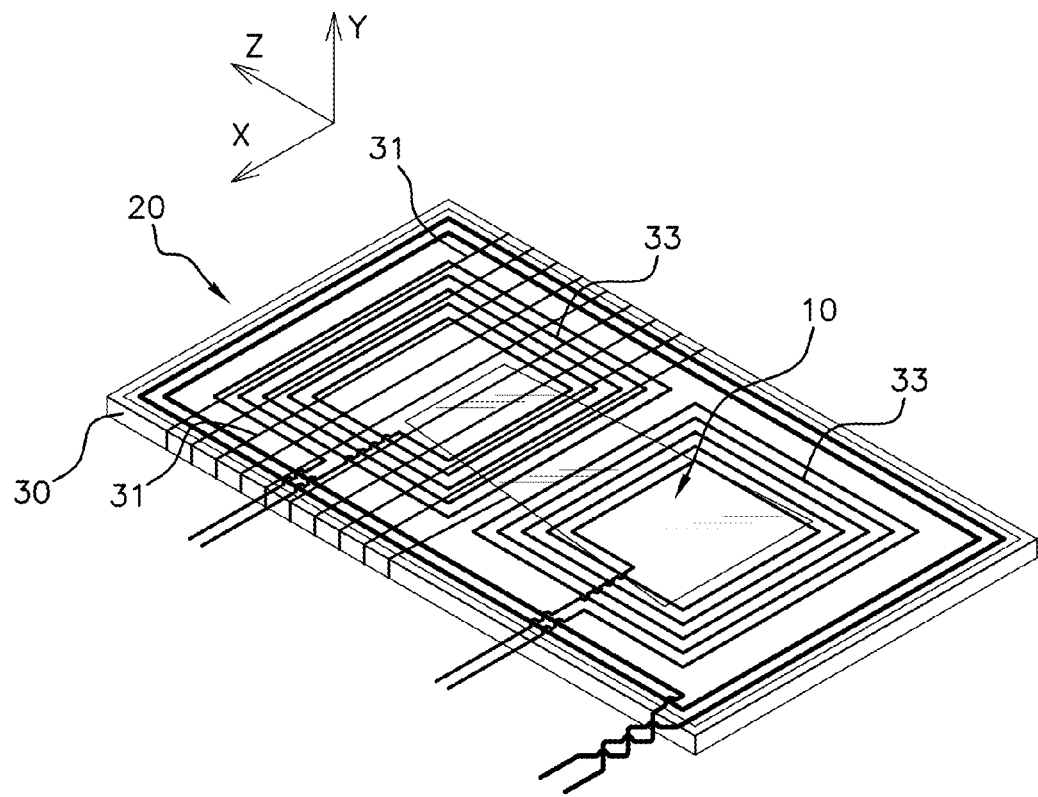

| | | | |
|---|---|---|---|
| 2001/0013997 A1* | 8/2001 | Sasaki | B82Y 10/00 360/125.73 |
| 2002/0044102 A1* | 4/2002 | Yokoshima | H01Q 1/243 343/895 |
| 2002/0080083 A1 | 6/2002 | Yamaguchi et al. | |
| 2003/0076093 A1* | 4/2003 | Lourens | G07C 9/00309 324/247 |
| 2003/0122725 A1* | 7/2003 | Ieda | H01Q 1/3241 343/788 |
| 2012/0025939 A1 | 2/2012 | Yamaguchi et al. | |
| 2014/0152513 A1 | 6/2014 | Nakagawa et al. | |

* cited by examiner

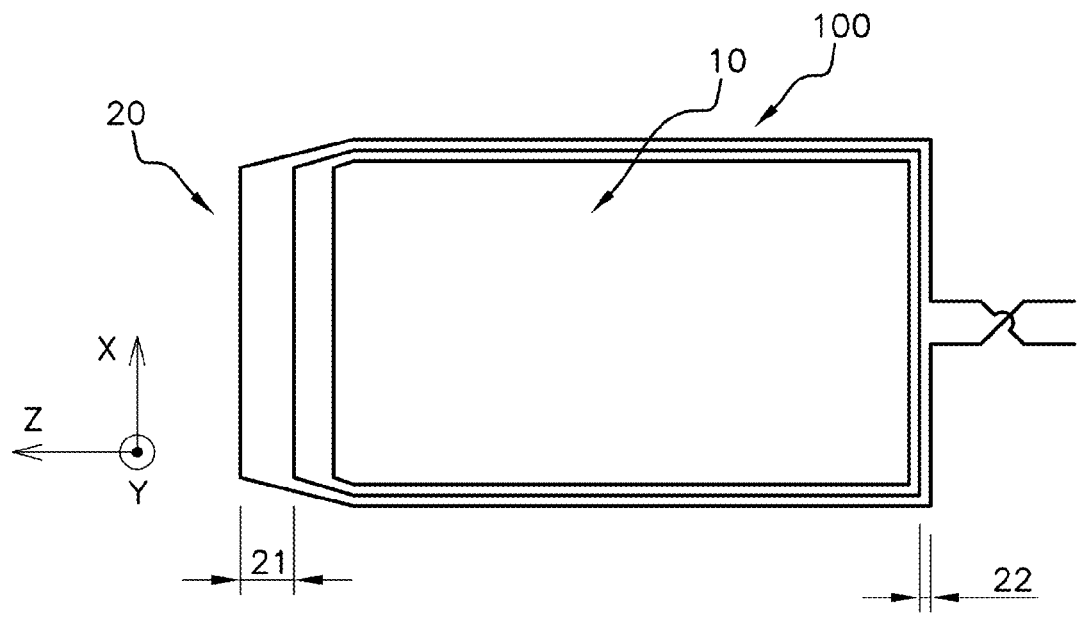
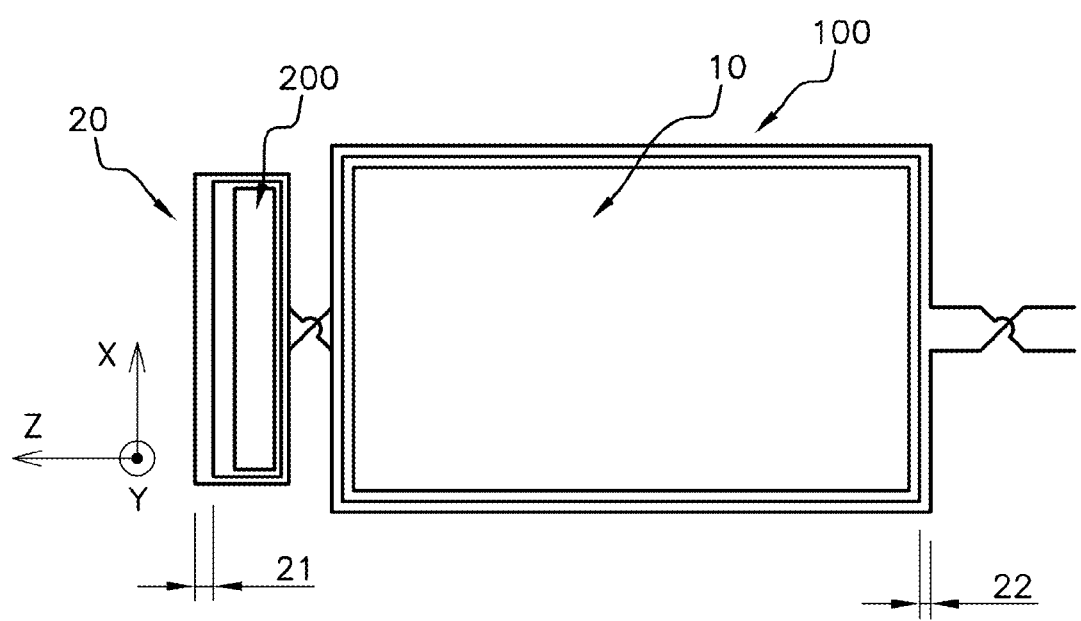

DEVICE FOR COMMUNICATION BY MAGNETIC COUPLING

This invention is in the domain of communication devices that use magnetic coupling, for example near-field communication (NFC) devices using magnetic coupling. In particular, the invention relates to a device that enables simultaneous communication by magnetic coupling in two different zones.

Nowadays, it is common to use near-field magnetic coupling communication technology, such as near field communication (NFC) technology. This communication technology can be used in numerous applications, such as contactless payments for example using a bank card or a mobile appliance such as a mobile telephone or a tablet computer. This technology may also be used to enable a user to access and start a vehicle, for example using a mobile telephone. This communication technology can be used in numerous different applications that the user may wish to use simultaneously on a single device.

Communication by magnetic coupling is possible if a user positions an appliance containing a coil close to a planar coil in a device, i.e. if the user places the appliance in a first zone that is ideally parallel to the planar coil of the device. Communication by magnetic coupling does not work if the user positions the coil in the appliance perpendicular to the planar coil in the device, i.e. in a second zone perpendicular to the first zone.

There are currently different devices for implementing communication by magnetic coupling in a device in first and second zones that are distinct from one another.

A first example of such a device includes to juxtaposed devices, each device having a control module and a planar coil. The planar coils of the two juxtaposed devices are positioned in planes perpendicular to one another. This first example device makes it possible to implement communication by magnetic coupling close to both planar coils. However, such a device has drawbacks. Indeed, the device is large and expensive on account of the use of two juxtaposed devices.

A second example device comprises a communication module linked by means of switches to two planar coils located in planes perpendicular to one another. Each planar coil is linked to the communication module by two switches that enable data to be sent and received. This device makes it possible to implement communication by magnetic coupling using a planar coil where said planar coil is linked to the communication module. This device is limited to alternate communication by magnetic coupling between two zones. Furthermore, the use of switches requires the power supplied by the communication module to be split, which results in a reduction in the range of the magnetic field, making same insufficient for certain desired functions provided using communication by magnetic coupling.

The present invention is intended to overcome some or all of the drawbacks in the prior art, in particular those set out above, by proposing a device for simultaneous communication by magnetic coupling in a first zone and in a second zone that are distinct from one another.

For this purpose, the present invention proposes a communication device using magnetic coupling including a communication module linked to a first planar coil. Said first coil is designed to form a magnetic field in which the field lines are orthogonal to the plane of said first coil in a first zone of said plane.

The device includes means for orienting the magnetic field such that the field lines are not orthogonal to the plane of said first coil in a second zone of said plane.

Such arrangements provide a device that enables communication by magnetic coupling in a first zone and in a second zone. Said first zone has a coverage zone enabling communication associated with a planar coil of an appliance oriented substantially parallel to said first planar coil of the device and facing said first planar coil. Said second zone has a coverage zone enabling communication associated with a planar coil of an appliance oriented substantially perpendicular to said first planar coil of the device.

Communication by magnetic coupling means near-field communication by magnetic coupling. This device enables near-field communication by magnetic coupling simultaneously in two different zones using just one communication module. These arrangements reduce size and improve performance and cost by obviating the need for the second communication module and the switches used in the prior art. Furthermore, the reduced size of the device makes it easier to integrate the device, for example into a motor vehicle.

In specific embodiments of the invention, said device may also include one or several of the following characteristics, taken individually or in any technically possible combination.

In specific embodiments of the invention, the communication module is designed to provide a communication signal at a predetermined communication frequency. The device includes a passive resonant circuit including a coil in the second zone. The axis of said coil is parallel to the plane of the first coil.

The predetermined communication frequency is around 13.56 MHz in the case of NFC technology. Such arrangements help to amplify the magnetic field in the second zone.

In specific embodiments of the invention, said first coil includes turns. The gap between said turns on the side of the second zone is greater than the gap between said turns on the side of the first coil opposite the second zone.

Such arrangements make it possible to reorient the magnetic field towards the second zone without adding additional hardware and at less expense.

In specific embodiments of the invention, the device includes a second planar coil on the side of said second zone that is directly connected to said first planar coil. In other words, said second planar coil is powered by the communication module via said first coil.

Said second planar coil includes turns. The gap between said turns of said second coil on the side of the second zone is greater than the gap between said turns of said first coil on the side opposite said second zone.

Such arrangements make it possible to reorient the magnetic field towards the second zone in another way.

In specific embodiments of the invention, the gap between said turns of said first coil on the side of the second zone and/or of said second coil in the second zone is at least three times greater than the gap between said turns of the first coil on the side opposite said second zone.

Such arrangements make it possible to further direct the magnetic field towards the second zone.

In specific embodiments of the invention, said device includes a supporting element for said first coil. Said supporting element includes a winding surrounding said supporting element. On said device, the number of turns on the side of the second zone is greater than the number of turns on the side opposite said second zone. Said winding of the supporting element is located towards the second zone.

The greater number of turns on the side of the second zone helps to orient the magnetic field towards said second zone.

Figure 4:
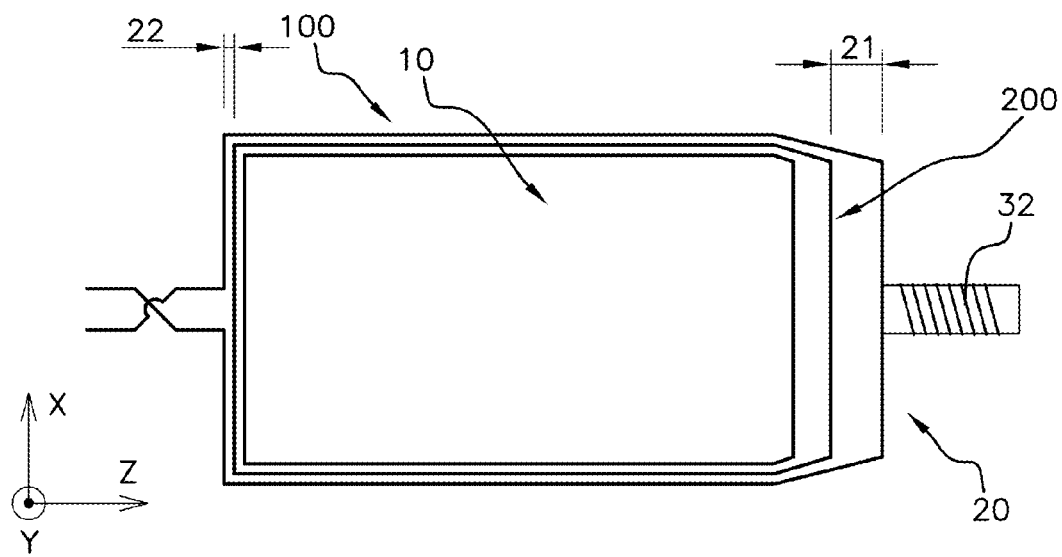

The invention can be better understood from the description below, provided as a nonlimiting example, with reference to FIGS. 1 to 4, in which:

FIG. 1 shows an example of a first planar coil modified to orient the magnetic field towards two zones of the device, FIG. 2 shows an example of a second planar coil directly connected to a first planar coil, FIG. 3 shows another example of a first planar coil including a winding about a supporting element of the first planar coil, FIG. 4 shows the example in FIG. 1 including a passive resonant circuit that includes a coil.

In these figures, the same reference numbers are used to identify identical or similar elements in different figures. For the sake of clarity, the elements are not shown to scale unless otherwise specified.

The invention relates to a near-field communication device using magnetic coupling.

The description is based on an orthogonal reference system XYZ in which the plane XZ is the plane containing a first planar coil 100 designed to form a magnetic field in which the field lines are orthogonal to the plane of said first coil 100 in a first zone 10 of said plane.

A communication module provides electricity to the first planar coil 100. The device to which the invention relates can work with a single communication module. The first planar coil 100 located in a plane XZ induces a magnetic field in which the field lines are orthogonal to the plane of said first coil 100 in a first zone 10 of said plane XZ, said first zone 10 being located inside the first coil 100. The first zone 10 has a coverage zone that enables communication associated with a planar coil of an appliance oriented substantially parallel to the plane of said first planar coil 100 of the device and facing said first coil 100.

The device to which the invention relates includes means for orienting the magnetic field of the first zone 10 towards a second zone 20 in order to implement near-field communication by magnetic coupling in the second zone 20. Said means obviate the need for the field lines to be orthogonal to the plane of the first coil 100 in a second zone 20. The second zone 20 is located in the plane outside the first coil 100. The second zone 20 has a coverage zone enabling communication associated with the plane of a planar coil of an appliance oriented substantially perpendicular to said first planar coil of the device. Thus, the appliance can measure a magnetic flow in the second zone 20. Communication by magnetic coupling is possible for an appliance forming an angle not exceeding approximately 45° with the magnetic field lines in said second zone 20. Different devices have been developed to achieve this.

FIG. 1 shows a first nonlimiting example embodiment of a device showing a first means for orienting the magnetic field on the side of the second zone 20.

The first planar coil 100 includes turns. To orient the magnetic field on the side of the second zone 20, the turns of the first planar coil 100 on the side of the second zone 20 have a gap 21 that is larger than the gap 21 22 between the turns of the first coil 100 located opposite the second zone 20. The gap 21 between the turns of the first planar coil 100 on the side of the second zone 20 is preferably at least three times larger than the gap 21 22 between the turns of the first coil 100 opposite the second zone 20. This larger gap 21 between the turns on the side of the second zone 20 makes it possible to orient the magnetic field generated by the first planar coil 100 on the side of the second zone 20.

FIG. 2 shows a second nonlimiting example embodiment of a device showing a second means for orienting the magnetic field on the side of the second zone 20.

The device in FIG. 2 has a first planar coil 100 and a second planar coil 200. The first coil 100 is located in a plane XZ. A communication source provides electricity to the first coil 100. The device may have just one communication module. The second coil 200 is located on the side of the second zone 20. The second coil 200 is directly linked to the first coil 100. In other words, the second coil 200 is powered by the communication module via the first coil 100. To orient the magnetic field on the side of the second zone 20, the turns of the second coil 200 on the side of the second zone 20 have a gap 21 that is larger than the gap 21 22 between the turns of the first coil 100 opposite the second zone 20. As with the example shown in FIG. 1, the gap 21 between the turns of the second planar coil 200 on the side of the second zone 20 is preferably at least three times larger than the gap 21 22 between the turns of the first coil 100 opposite the second zone 20.

FIG. 3 shows a third nonlimiting example embodiment of a device showing a third means for orienting the magnetic field on the side of the second zone 20.

The device in FIG. 3 includes a device for near-field communication by magnetic coupling that is compatible with NFC technology and that includes a first planar coil 100. The device includes a supporting element 30 that holds the first coil 100. In this example embodiment of the invention, the supporting element 30 is used to enable the magnetic field of the first zone 10 to be oriented towards the second zone 20 in order to implement communication by magnetic coupling in the second zone 20. The supporting element 30 includes a winding 31 surrounding the supporting element 30. As shown in FIG. 3, the winding 31 surrounds the supporting element 30 as well as a portion of the first coil 100. The winding 31 of the supporting element 30 in FIG. 3 covers one half of the supporting element 30. More specifically, the portion of the supporting element 30 that includes a winding 31 is the half of the supporting element 30 located on the side of the second zone 20. The winding 31 preferably starts near a central portion of the first planar coil 100 and ends towards the second zone 20. This winding 31 makes it possible to orient the magnetic field towards the second zone 20. This device enables the magnetic field to have a range of around 6 cm along the axis Y and of around 4 cm along the axis Z towards the second zone 20.

The device shown in FIG. 3 also has an electrical inductive charging device, as specified by the Wireless Power Consortium (WPC), which includes the coils 33. In this example embodiment, the supporting element 30 includes ferrite. The ferrite supporting element 30 is used for the electrical inductive charging device. The ferrite supporting element 30 is therefore advantageously used as a supporting element for the winding 31 used to orient the magnetic field on the side of the second zone 20, as well as for electrical charging.

As shown in FIG. 3, the winding 31 covers the half of the ferrite supporting element 30 on the side of the second zone 20.

This third example shows a device used to charge a mobile appliance in a first zone 10 and to simultaneously communicate with another mobile appliance in a second zone 20.

In general, in order to amplify the magnetic field in the second zone 20, the device has, on the side of the second zone 20, a passive resonant circuit 32 including a coil, as shown in FIG. 4. The coil is arranged on an axis parallel to the plane of the first coil 100. The passive resonant circuit 32 is resonant at 13.56 MHz if the device for near-field communication using magnetic coupling is compatible with NFC technology.

In another example embodiment of the invention, the passive resonant circuit 32 has three coils located in the second zone 20 and distributed along the second zone 20 along the axis X.

The description above clearly illustrates how the different features and advantages of the present invention achieve the objectives set. Specifically, the present invention enables near-field communication by magnetic coupling to be used simultaneously in two different zones of one device. The planes of the coils of the appliances positioned near to the zones of the device to which the invention relates are substantially perpendicular to one another.

The invention claimed is:

1. A communication device using magnetic coupling comprising a communication module linked to a first planar coil (100), said first coil (100) being designed to form a magnetic field in which the field lines are orthogonal to the plane of said first coil (100) in a first zone (10) of said plane, the device having means for orienting the magnetic field such that the field lines are not orthogonal to the plane of said first coil (100) in a second zone (20) of said plane
said device being wherein said first coil (100) has turns, the gap (21) between said turns on the side of the second zone (20) is greater than the gap (2122) between said turns on the side of the first coil (100) opposite the second zone (20).

2. The device as claimed in claim 1, wherein the communication module is designed to provide a communication signal at a predetermined communication frequency, the device includes a passive resonant circuit (32) including a coil in the second zone (20), the axis of said coil being parallel to the plane of the first coil (100).

3. The device as claimed in claim 1, including a second coil (200) on the side of said second zone (20) that is directly connected to said first planar coil (100).

4. The device as claimed in claim 3, in which said second planar coil (200) has turns, the gap (21) between said turns on said second coil (200) on the side of the second zone (20) is greater than the gap (2122) between said turns of said first coil (100) on the side opposite said second zone (20).

5. The device as claimed in claim 3, in which the gap (21) between said turns of said first coil (100) on the side of the second zone (20) and/or of the second coil (200) on the side of said second zone (20) is at least three times greater than the gap (2122) between said coils on the side opposite said second zone (20).

6. The device as claimed in claim 1, including a supporting element (30) for the first coil (100), said supporting element (30) having a winding (31) surrounding said supporting element (30).

7. The device as claimed in claim 6, in which the number of turns on the side of the second zone (20) is greater than the number of turns on the side opposite said second zone (20).

8. The device as claimed in claim 6, in which said winding (31) of the supporting element (30) is oriented towards the second zone (20).

9. The device as claimed in claim 2, including a second coil (200) on the side of said second zone (20) that is directly connected to said first planar coil (100).

10. The device as claimed in claim 4, in which the gap (21) between said turns of said first coil (100) on the side of the second zone (20) and/or of the second coil (200) on the side of said second zone (20) is at least three times greater than the gap (2122) between said coils on the side opposite said second zone (20).

11. The device as claimed in claim 2, including a supporting element (30) for the first coil (100), said supporting element (30) having a winding (31) surrounding said supporting element (30).

12. The device as claimed in claim 3, including a supporting element (30) for the first coil (100), said supporting element (30) having a winding (31) surrounding said supporting element (30).

13. The device as claimed in claim 4, including a supporting element (30) for the first coil (100), said supporting element (30) having a winding (31) surrounding said supporting element (30).

14. The device as claimed in claim 5, including a supporting element (30) for the first coil (100), said supporting element (30) having a winding (31) surrounding said supporting element (30).

15. The device as claimed in claim 7, in which said winding (31) of the supporting element (30) is oriented towards the second zone (20).

16. The device as claimed in claim 9, in which the gap (21) between said turns of said first coil (100) on the side of the second zone (20) and/or of the second coil (200) on the side of said second zone (20) is at least three times greater than the gap (2122) between said coils on the side opposite said second zone (20).

17. The device as claimed in claim 9, including a supporting element (30) for the first coil (100), said supporting element (30) having a winding (31) surrounding said supporting element (30).

18. The device as claimed in claim 10, including a supporting element (30) for the first coil (100), said supporting element (30) having a winding (31) surrounding said supporting element (30).

19. The device as claimed in claim 16, including a supporting element (30) for the first coil (100), said supporting element (30) having a winding (31) surrounding said supporting element (30).

20. The device as claimed in claim 14, in which said winding (31) of the supporting element (30) is oriented towards the second zone (20).

* * * * *